United States Patent [19]

Steinkamp et al.

[11] 4,001,172

[45] Jan. 4, 1977

[54] POLYMERS WITH IMPROVED PROPERTIES AND PROCESS THEREFOR

[75] Inventors: Robert A. Steinkamp; Thomas J. Grail, both of Baytown, Tex.

[73] Assignee: Exxon Research & Engineering Co., Linden, N.J.

[22] Filed: July 10, 1974

[21] Appl. No.: 487,070

Related U.S. Application Data

[60] Division of Ser. No. 240,494, April 3, 1972, Pat. No. 3,862,265, and a continuation-in-part of Ser. No. 132,838, April 9, 1971, abandoned.

[52] U.S. Cl. .............................. 260/42.18; 260/42; 260/876 R; 260/878 R
[51] Int. Cl.² ...................... C08K 7/14; C08K 3/04; C08F 255/02; C08F 255/08
[58] Field of Search ........ 260/878 R, 876 R, 42.18, 260/42

[56] References Cited

UNITED STATES PATENTS

| | | | |
|---|---|---|---|
| 3,830,888 | 8/1974 | King | 260/876 R |
| 3,856,889 | 12/1974 | McConnell | 260/876 R |
| 3,862,265 | 1/1975 | Steinkamp et al. | 260/878 R |
| 3,862,266 | 1/1975 | McConnell et al. | 260/878 R |

*Primary Examiner*—Alan Holler
*Attorney, Agent, or Firm*—David A. Roth

[57] ABSTRACT

Modified polymers, particularly polyolefins having improved flow and in some instances improved adhesion properties over that of a polymeric, e.g. polyolefin, base stock used as a starting material, are produced by a controlled reaction often involving degradation in an extruder, in which an initiator is injected under conditions of either maximum distribution or intensive mixing wherein appreciable rheological, i.e. molecular weight distribution, changes in said base polymer occur. In some embodiments monomers are also grafted to said base stock, during said degradation process. In such instances, exceptional, novel, grafted polymers with high melt flow properties and other useful properties are obtained.

20 Claims, 3 Drawing Figures

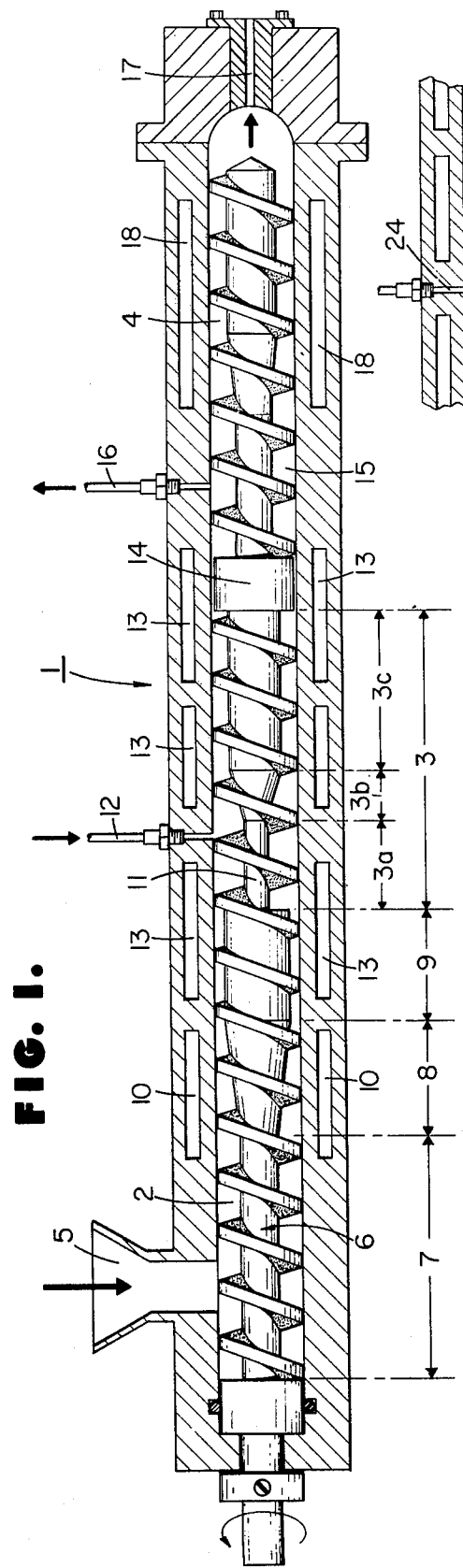
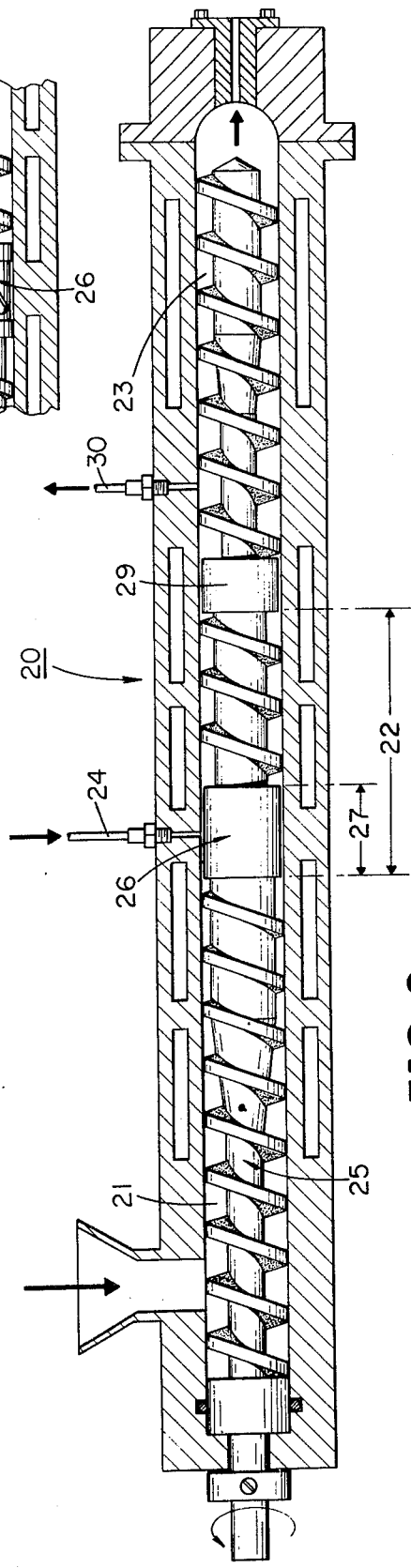

POLYMERS WITH IMPROVED PROPERTIES AND PROCESS THEREFOR

This is a division, of application Ser. No. 240,494, filed 4/3/72, now U.S. Pat. No. 3,862,265, and a CIP of Ser. No. 132,838 filed 4-9-71 now abandoned.

BACKGROUND OF THE INVENTION

Extruders have been used conventionally for many years to process all types of polymeric materials and especially polyolefins. Generally, the polymer is melted and worked to some extent in the extruder and conveyed to a particular molding means so that it is in the proper state to be handled by that specific means.

In recent years, it has become known that various chemical reactions and modifications can take place when a polymer passes within the extruder. These modifications, in a manner, are hitching a ride or "piggybacking" on a polymer which is already being routinely processed. Thus it is a tag-along process. The modifications can be accomplished in such a way that significant changes in the polymer composition and/or rheology can be effected.

There are numerous patents on such techniques of modifying polymers and many of these are specifically directed to the grafting of monomers to polymers that are being still processed. This background disclosure is restricted to those which are believed most relevant.

Very basic is British Pat. No. 679,562 which shows graft polymerization to polymers taking the place when the polymer is subjected to suitable mechanical working such as high-speed stirring, shaking, milling, kneading, grinding, ultrasonic vibrations or passage through filters or capillary tubes at high linear velocities, all of which lead to degradation of the polymer and create reactive sites.

U.S. Pat. No. 3,177,269 and U.S. Pat. No. 3,177,270 are pertinent patents which disclose the formation of graft copolymers by adding initiator and monomer to a polymer as it is being extruded. The polymer is "malaxed" to such a low degree that no degradation takes place.

U.S. Pat. No. 3,013,003 also discloses polymer degradation in an extruder and utilizes a stabilizer to prevent undue degradation. U.S. Pat. No. 3,270,090 is a variant of U.S. Pat. No. 3,177,269 in which the polymer is pre-irradiated before being subjected to extrusion.

U.S. Pat. No. 3,563,972 and U.S. Pat. No. 3,551,943 are relevant to polymer modification and extrusion using an oxygen-containing gas as an initiator to cause polymer breakdown at relatively high temperatures and without any special mixing modification. British Pat. No. 1,217,231 relates to grafting modifications wherein the amount of grafted polymer and homopolymer are controlled in some predefined ratio. British Pat. No. 1,042,178 teaches the preparation of modified polyolefins by shearing at extremely high shear rates in screw extruders, high-speed mills, roll mills and the like at a shear rate of at least 1500 reciprocal seconds.

Belgium Pat. Nos. 742,340, 742,338, 742,272 and 742,339 also relate to grafting processes of interest.

As will be seen hereinafter, none of these disclose, hint or suggest in any manner whatsoever Applicants' novel, unique and unobvious process and apparatus for modifying in a most unusual and desirable manner a polymer feedstock to in many instances result in novel polymers with very useful properties.

SUMMARY OF THE INVENTION

The invention relates to the formation and use of a special reaction zone within an extruder wherein reaction conditions can be chosen and controlled in order to effect: 1) instantaneous, intensive mixing of added reactants with a polymer or 2) intensive distribution of added reactants to a polymer, both of which in turn allow ready achievement of special rheological modifications of a polymer passing through said extruder.

Three especially important process parameters that can be controlled are the shear, pressure and temperature within very short time periods. Applicants' discovery of how to effect such controls leads to the several unobvious and useful features of the invention.

Moreover, in a preferred embodiment, auxilliary reactants are introduced into that zone under conditions where maximum effects occur within minimum time parameters. Not only can a polymer be modified in terms of its rheology, e.g. molecular weight and flow characteristics, but it can also be simultaneously modified in terms of chemical modifications. This involves chemically reacting additional materials therewith, especially to form novel grafted, shorter chain length polymers from the base polymers.

RELATED APPLICATIONS

This application is a continuation-in-part of Ser. No. 132,838 filed Apr. 9, 1971, entitled "Polyolefin Acrylic Acid Graft Copolymers.", now abandoned.

BRIEF DESCRIPTION OF THE DRAWINGS

FIG. 1 is a schematic view of one preferred extruder apparatus embodiment of the invention for carrying out the process of the present invention wherein an initiator is added to a decompression zone;

FIG. 2 is a schematic view of another preferred extruder apparatus embodiment wherein a high shear-thin film zone under high pressure conditions is provided for appropriate polymer reactions and for exceptionally good mixing; and FIG. 3 is a schematic view of a special "Egan" mixer which can be used in the apparatus of FIG. 2.

DESCRIPTION OF THE PREFERRED EMBODIMENTS

It has been discovered and forms the substantial conceptual basis of this invention that extraordinary process and product benefits relating to polymer modifications can be achieved by the formation and use of special reaction zones and conditions within an extruder. Relatively low temperatures and high throughputs can be used. Furthermore, grafted products resulting therefrom are novel and possess unusual properties. Also, the economics of the process are quite improved.

Fundamentally, the invention resides in the discovery and utilization of either of two essential controlling factors in extruder reaction operations. That is, one of these factors is that in order for significant modifications to be made to polymers being processed under high pressure, the reagent or reagents which are to interact with the polymer must be extraordinarily thoroughly and intensively mixed with the polymer over a very short interval of time. Thus, a much higher order of magnitude of mixing is require than occurs when the teachings of the art relevant to the introducing of a modifying reactant in conventional extruder operations are consulted.

In order to accomplish this highly, intensive mixing or dispersion in the extremely short periods of time, it was discovered and is one of the essential features of this invention that under pressure conditions intensive, extremely good mixing is obtained by utilizing a high shear-thin film zone to provide the necessary mixing.

In essence, in this embodiment, an instantaneous, high intensity mixing zone is provided where an extremely high degree of mixing occurs in a very short period of time. In its simplest aspects, mixing can occur under two different general types of conditions. These are extensive mixing and intensive mixing. They are defined as follows:

EXTENSIVE MIXING

The material is constantly changing in its flow direction according to statistical laws, so that each particle moves sometimes on the surface and sometimes in the body of the mass of material.

INTENSIVE MIXING

Adjacent layers of materials have different speeds, i.e. there is a velocity gradient or shear rate between them,
thus the mixing effect is due to the displacement of layers with respect to one another.

In the intensive, instantaneous high pressure, thin film high shear mixing zone feature of the invention, either or both of these types of mixing occur with great intensity for relatively short periods of time.

One important feature of the invention has been discussed. It relates to effecting significant changes during normal operation of an extruder with at least the high pressures after the first stage metering zone.

Another very important aspect of the invention is based on a diametrically opposed principle. It is grounded on the following consideration. Commonly in extruder design, toward the end of the extrusion run reduced pressure areas with vents are provided for venting off any volatiles formed during the extrusion process.

The essence of this facet of the invention is the recognition that one or more decompression zones, i.e. reduced pressure zones accompanied by injection orifices or conduits should be provided at a point where the polymer is in a molten state.

This provides excellent, efficient reactions when reactants (preferably fluid) are introduced in the reduced pressure zone under a pressure head. Because of the reduced pressure, the reactants are immediately distributed over the total surface area of the molten polymer.

Moreover, in this process of the invention and means for carrying out such process, the reaction conditions accompanying either the pressure reduction embodiment or the high shear-thin film high pressure embodiment are also closely controlled. That is, temperature and melt viscosity of the polymer are controlled. Moreover, materials can be added to another portion of the extruder prior to the reaction, become mixed by extruder action, and thence conveyed to the reaction zone where they are available to participate in the reaction.

There are some preferred but optional additional features to the invention which tend to improve the quality of the product.

One of these is the concept of sealing or capping both the high pressure-high shear reaction zone or the low pressure reaction zone with a device such as a blister, defining the completed reaction portion of the reaction zone. This is generally used in conjunction with a subsequent pressure relieving vent.

The preferred embodiment of such a device or blister is an enlarged cross-sectional portion of a screw root which prevents gaseous reactants from easily leaving the reaction zone.

Preferably, the capping of the reactants is accompanied by a subsequent venting under reduced pressure so that vaporous components are removed. The capping also prevents vaporous reactants from being prematurely removed from the reaction zone.

Venting serves to prevent undesirable pressure build-up, corrosion caused by reactive vapors, odoriferous products, corrosive products, easily degradable products and the like.

While the process of the invention is applicable to all polymers capable of being processed by an extruder, particularly thermoplastics such as nylons, polyesters, polycarbonates, engineering plastics, and acetals, it is especially useful for $C_2$–$C_8$, preferably $C_2$–$C_5$, polyolefins including copolymers of olefins with other monomers such as vinyl monomers in which the predominant constituent is the olefinic portion.

The process is also useful for elastomers, particularly polyolefins, but can include silicone elastomers and the like. Furthermore, a distinction should be drawn between polymers whose properties are largely determined by the ethylene content and those polymers whose properties are large determined by their $C_3$ to $C_8$ olefinic content.

This distinction is primarily evidenced in the fact that polyethylene and ethylene-containing polymers tend to simultaneously cross-link and degrade under some of the conditions in the reactor under which $C_3$ and above polyolefins would not cross-link but would tend to degrade.

Therefore, in the description of the invention as follows, from time to time certain differences in the applicable process conditions must be employed when the primary characteristics of the polymer are determined as a result of its ethylene content.

It is also to be noted that the process of the invention is applicable to elastomers of all classes which are capable of being handled by an extruder. Examples include natural rubber, polyisobutylene, butyl rubber, chlorobutyl rubber, polybutadiene, butadiene-styrene rubber, ethylenepropylene elastomers, ethylene-propylene diene terpolymer elastomers and mixtures thereof with each other and with thermoplastic polymers. Blends of elastomers and plastics in any portions particularly benefit from being processed by the technique of the invention.

Polyolefins, both plastics and elastomers, in particular but also other thermoplastics are used in many end uses where it is desired that they have the characteristics of being able to flow well during processing. This is especially true for the production of films, fibers, injection moldings and the like.

But many polymeric rheological properties depend not only on the average molecular weight of the polymer but also the molecular weight distribution (as measured by die swell) of the individual polymer molecules within the mass. Thus, it is well known that a polymer having a narrow molecular weight distribution will behave differently from a substance having the same general molecular weight but a much wider molecular weight distribution.

For a great many commercial applications, narrow molecular weight distribtions are more desirable than wide ones. For some elastomers and low molecular weight plastics, $\overline{M}$ w/$\overline{M}$ n is useful for measuring molecular weight distribution. But die swell (defined hereafter) is a much more useful measure. See U.S. Pat. No. 3,562,804 for a description of molecular weight distribution using $\overline{M}$ w/$\overline{M}$ n as a standard. In general, narrow molecular weight distributions indicate a trend toward lower viscosities and improved flow properties.

Plainly, the best way of trying to obtain such desirable narrow molecular weight distribution would be direct synthesis of the material. That is, one would desirably control the polymerization in such a way that the desired narrow molecular weight distribution is obtained. Nevertheless, no really effective way of doing this during the synthesis of the polymer is known.

Therefore, conventional techniques of trying to achieve molecular weight changes have taken the route of heating at high temperatures in order to thermally degrade the molecules. This can result in unpleasant odors with undesirable quality discolorations, but even more disadvantageous is the pronounced loss of process effectiveness at high temperatures.

Another method relies on the use of atmospheric oxygen but this also has similar drawbacks, i.e. high temperatures are required. High temperatures result in considerably reduced product output.

It has been discovered and forms one of the major features of this invention that many polymers, particularly, polyolefins, especially polypropylene, polybutylene and to some extent polyethylene (except when there are extensive accompanying cross-linking reactions), can be very suitably narrowed in their molecular weight distribution by the use of the controlled process features wherein very excellent mixing or dispersion of reactants is accomplished by using a process employing one of the extruder configurations as described herein.

When the polymer is in the molten state, at the proper temperature and at essentially reduced pressures with respect to a first stage metering section of the extruder or in a high shear-thin film mode (with high pressures), initiators of various types can be included with it, and very rapid diffusion or dispersion of the initiator or other reactant throughout the polymer will occur. Thus, it is possible to achieve extensive reactions with very short reaction zone residence times.

Directionally, in most instances, due to controlled degradation the length of the individual polymer molecules will all tend to become approximately the same, thus resulting in the desirable narrow molecular weight distribution as well as some concomitant reduction in molecular weights. Crystallinity and other desirable characteristics of the polymer are retained.

Moreover, in place of or to supplement the molecular weight distribution alteration described above, reactive and/or polymerizable monomers can be introduced in the presence of appropriate catalysts or initiators (usually the same compounds which cause polymer breakdown) with the monomer to cause grafting and usually, but not always polymerization of such monomers on the active sites created in the polymer by the particular reactive conditions existing in the zone at that time.

The process of the invention is particularly noteworthy since it provides for the first time a technique for simultaneously narrowing the molecular weight distribution as evidenced by lower die swell of polymer or making the polymer substantially more flowable, while at the same time achieving a degree of grafting over a wide range.

Furthermore, a great many of the resulting grafted polymers with their unique properties are also novel compounds. For instance, grafted polypropylene with from 0.02 to 20 weight percent grafted component having a MFR of from about 3 to 1,000, and preferably more than 20 to 1,000, said MFR being at least 50% higher than the MFR of a base polymer and with die swells at least 0.05 units lower than the base polymer have never been prepared before.

In this connection, it is important to grasp that two polymers with identical MFR can be completely different in molecular weight distribution, although roughly equal in viscosity average molecular weight. Thus, MFR is an approximate indication of viscosity average molecular weight. Die swell is a measure of molecular weight distribution. Generally, the lower the die swell, the narrower the molecular weight distribution. The latter is controlling for most practical purposes.

Grafted polymers with relatively narrow molecular weight distributions are novel and preferred. The term relatively refers to the base polymer which is the polymer directly from synthesis, i.e. befoe any measurable scission, degradation, chain breakage, etc.

For most $C_3$ to $C_8$ polyolefins, cross-linking is not a problem. But for those that contain ethylene or for polyethylene, slightly different procedures can be effected to prevent cross-linking. Among these are included the creation of activated sites on the polyethylene by initiators which do not promote cross-linking, e.g. gaseous oxygen, organic tin compounds, organic sulfur compounds, heat stabilizers, acid anhydrides and the like.

Also, either the initiators or monomers can be separately introduced at a time prior to the introduction of the other component, monomer, or initiator, so that the reaction tends to form grafts rather than to form cross-links. Furthermore, the temperatures can be controlled to minimize cross-linking.

The process of the invention is highly flexible and a great many modifications such as those proposed above are available to carry out any particular purposes desired.

For instance, if the quantity of homopolymer formed by the polymerization of the grafting monomer is desired to be decreased, it is contemplated that initiator can be added to the polymer prior to the addition of monomer (just a few microseconds prior is probably adequate) so that intimate mixing of the initiator with the polymer takes place prior to the introduction of monomer. Thus, when the monomer is introduced, large quantities of monomer do not contact large quantities of initiator, and the formation of homopolymer is minimized. The reverse of this process sequence could also be effected.

Of course, mixtures of monomer can be also added so as to achieve graft copolymers in which the graft chains at least two different monomers therein (in addition to the base polymer monomers).

It is also possible to graft materials to the polymers which do not form polymers. For instance, it is possible to graft materials which could act as antistats, light stabilizers, photodegradation agents, nucleating agents, flame retardancy, heat stabilizers, plasticizers, slip agents, colorants, etc. One way of accomplishing this is by providing an unsaturated site accompanied by steric hindrance or bulkiness factors in the monomer itself so that only one monomer grafts on to any one site. Thus, polymerization is discouraged. Monomers that will react directly with the functional grafts will also satisfactorily perform the above functions.

The class of preferred monomers which will form graft polymers in the process of the invention have functional groups such as carboxylic acid groups, hydroxy groups, nitrile, amine ester, polyether sequence groups, imide groups, amide groups, glycidyl groups, epoxy groups and the like in addition to at least one point of unsaturation.

These functionalities can be subsequently reacted in the extruder or later with other modifying materials in order to change the properties of the graft and result in heat stabilizers, light stabilizers or absorbers, nucleating agents, slip agents, photodegradation agents, flame retardancy, antistats, or plasticizers, etc.

For instance, a graft of an acid-containing monomer could be suitably modified by esterifying the resulting acid groups in the graft with appropriate reaction with hydroxy-containing compounds of varying carbon atoms lengths. The reaction could take place simultaneously with the grafting or in a subsequent post modification reaction.

It is to be noted that the process of the invention differs considerably from just a high shear process such as the one described in British Pat. No. 1,042,178. There, the speed of the extruder is extremely high and produces exceptionally strong shearing activity. These shearing actions work the polymer, melt it and cause degradation very shortly after start-up. They also would wear out the screw or blades in just a very few weeks.

Although this mode might be satisfactory for some purposes, it is to be appreciated that operation of equipment of this nature requires the input of extremely high energy levels and therefore, is economically not attractive. Particularly, when compared to a process which uses relatively low energy levels in terms of shear, that is, ordinary extruder screw speeds. Thus, the process of the present invention uses relatively low shear gradients in combination with initiators which are added at very critical reaction zone points in the extruder operation.

Another advantage for the process of the invention and the products made therefrom is that the resulting materials can be blended in essentially all portions with materials which have not been modified. Relatively high ratios of unmodified materials to modified materials can be used to create blends which partake of much of the improved properties of the modified polymer. Thus, the products of the invention have utility as additives per se.

The grafted polymer will usually contain from 0.02 to 20, preferably 0.1 to 10, and most preferably 0.2 to 8 weight percent of grafted portion.

When suitable monomers are used to form grafts, one of the outstanding properties obtained in addition to the rheological flow properties which have been discussed above are very beneficial improvements in the adhesion properties of the polymer. Thus the grafted polymers of the invention can be prepared to adhere to almost any substrate, even with relatively low graft component, i.e. 1% or less graft based on total polymer. Many nonpolar polymers such as polyolefins do not adhere very well to metal materials and other materials such as plastics, such as nylon, polyesters, fluorinated polymers, etc. Moreover, they do not accept dyes, paints, coatings, metal plating, printing and the like well, at all. After having been modified with the appropriate monomers, according to the process of the invention, modified polyolefins can possess all of these attributes, which are lacking from the characterisitics of the base polymer.

Furthermore, the materials, as modified, can still be used for any purpose for which an unmodified material (base polymer) was formerly used. That is, they can be foamed, into plastisols, powders, dispersed as colloidal mixtures, emulsified, extruded and molded in any convenient manner.

The preferred modifying monomers are unsaturated mono- and polycarboxylic-containing acids ($C_3$–$C_{10}$) with preferably at least one olefinic unsaturation, and anhydrides, salts, esters, ethers, amides, nitriles, thiols, thioacids, glycidyl, cyano, hydroxy, glycol, and other substituted derivatives from said acids.

Examples of such acids, anhydrides and derivatives thereof include maleic acid, fumaric acid, himic acid, itaconic acid, citraconic acid, acrylic acid, glycidyl acrylate, cyanoacrylates, hydroxy $C_1$–$C_{20}$ alkyl methacrylates, acrylic polyethers, acrylic anhydride, methacrylic acid, crotonic acid, isocrotonic acid, mesaconic acid, angelic acid, maleic anhydride, itaconic anhydride, citraconic anhydride, himic anhydride, acrylonitrile, methacrylonitrile, sodium acrylate, calcium acrylate, and magnesium acrylate.

Other monomers which can be used either by themselves or in combination with one or more of the carboxylic acids or derivatives thereof include $C_2$–$C_{50}$ vinyl monomers such as acrylamide, acrylonitrile and monovinyl aromatic compounds, i.e. styrene, chlorostyrenes, bromostyrenes, a-methyl styrene, vinyl pyridines and the like.

Other monomers which can be used are $C_4$ to $C_{50}$ vinyl esters, vinyl ethers and allyl esters, such as vinyl butyrate, vinyl laurate, vinyl stearate, vinyl adipate and the like, and monomers having two or more vinyl groups, such as divinyl benzene, ethylene dimethacrylate, triallyl phosphite, dialkylcyanurate and triallyl cyanurate.

Thus, in general, any material having the ability to react with the base polymer, particularly under free radical conditions, and at the melt temperature of the base polymer is operable for the purposes of the invention.

A large proportion of the materials falling in this class will be polymerizable monomers, but not all. Some will be materials which are reactive with the base polymer, but do not form polymers, i.e. maleic anhydride.

Also, a large proportion of the materials falling in the class will have functionality in addition to unsaturation, but not necessarily so, i.e. styrene or ethylene.

A subgeneric definition that encompasses a class of suitable reactants is as follows:

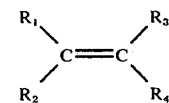

wherein
a. when $R_1 = R_2 = R_3 = R_4$, $R_4$ is H or halogen, preferably F and Cl b. when $R_1$ and $R_2$ are H, $R_3$ is H, halogen or $C_1$ to $C_{10}$ alkyl and $R_4$ is halogen, $-COOR_5$,

$C_1$ to $C_{50}$, preferably $C_1$ to $C_{30}$ and most preferably $C_1$ to $C_{10}$ alkyl, aryl, alkyaryl, and substituted derivatives thereof,

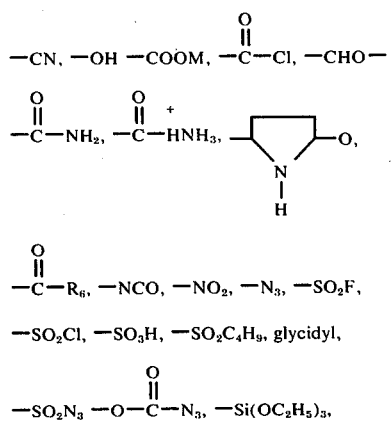

$-SO-C_2H_5$, $SO_2C_2H_5$, wherein $R_5 =$ H or $R_6$ and $R_6$ is a $C_1$ to $C_{50}$ hydrocarbon group and M is a metal of any valance.

c. $R_1$ and $R_3$ are H and $R_2$ and $R_4$ are connected into a strained ring compound having 4 to 50 carbon atoms such as himic acid, vinylene carbonate, norbornenes, cyclopentadienes, cyclopentenes, cyclohexenes and the like.

It has been further noted that when grafts are produced in polymers according to the process of the invention that these grafted polymers when used in fairly small quantities act as nucleating agents, thus, accelerating or shortening the time period in which thes polymer starts hardening and forming solid plastic from the melt. They also tend to increase the clarity of the polymer and therefore can be used for purposes where clarity is important, e.g. films, bottles and the like. The nucleating effect can be observed at very low concentrations of graft polymer used as an additive in other polymers.

Of course, any of the standard additives can be used with these modified polymers. They include conventional heat stabilizers, slip-agents, antioxidants, antistatic agents, colorants, flame retardants, heat stabilizers, plasticizers, preservatives, processing aids and the like.

Fibrous reinforcements sch as asbestos, boron filaments, carbon and graphite fibers, ceramic fibers, fibrous glass, fibers or other polymers such as polyvinyl alcohol fibers, sapphire filaments and whiskers; nonfibrous fillers such as barium sulphate, portland cement, talc fumed colloidal silica, calcium carbonate, silica, metal powders, metallic oxides (interact with carboxyl groups), calcium silicate, glass spheres, Saran spheres, Kaolin clay, Nepheline syenite and the like. Ferrous and non-ferrous wires and the like are particularly effective in the polymers prepared according to the invention. The fillers or reinforcement materials can be added as they would to unmodified materials, or they can be added in many cases to the same extruder in which the modifying reaction is taking place.

The uses for the grafted polymers of the invention are vastly expanded in scope since good bonding and fastening are obtained with these materials. They can be printed and decorated through decorative overlays, electroplated, hotstamped, painted, printed and vacuum metalized.

Tapes made from the polymers of the invention, particularly those of acrylic acid grafted polypropylene, are outstanding for adhering nails in nail stacks to be used in nail guns.

The tapes are also outstanding for strapping and other uses where adhesion and strength are important properties, especially when containing 10 to 70 weight percent elastomer.

In processing, they can be blow-molded by extrusion injection or performed, calender casting, centrifugally molded, extrusion coated, powder coated, transfer coated, compression molded, extruded, foam processed, injection molded, mechanically formed, rotationally molded, reinforced molded, thermoformed, web impregnated and the like. The polymers of the invention are especially suitable as coatings or film laminates to other polymers, e.g. laminates of glycidyl acrylate grafted polypropylene to nylon, Mylar, etc.

It is to be emphasized that in the definition of the base polymer, substituted polymers are also included; thus, the backbone of the polymer before grafting can be substituted with functional groups such as chlorine, hydroxy, carboxy, nitrile, ester, amine and the like.

Furthermore, polymers which have been grafted with monomeric substances, particularly those with functional carboxylic acid groups, can be additionally cross-linked in a conventional manner or by using metallic salts to obtain ionomeric crosslinking.

It is very desirable to have a material which initially will flow very readily upon processing and will subsequently set up very rigidly, when processing is finished, through cross-links. The materials produced by the process of the invention are capable of being employed in this manner. When cross-linking is contemplated, the polymer can be very drastically decreased in molecular weight by using much more free radical initiator, i.e. from 0.05 to 5 weight percent, based on starting polymer. Polymers having intrinsic viscosities of 0.8 and below, i.e. 500 to 6,000, preferably 1,000 to 5,000, and most preferably 2,500 to 4,500 centipoises, are especially suitable for cross-linking after grafting with monomers described herein.

Not only can these low molecular weight polymers be cross-linked, but they can also be emulsified and otherwise used for surface coatings.

Thus, it is within the scope of the invention that polymers can be treated with the process of the invention, not only in order to reduce the molecular weight and narrow the molecular weight distribution, for traditional plastic end uses, but also to make the polymer suitable for use for surface coatings and adding to fuels, lubricating oils, lubricants and spray oils as viscosity modifiers, sludge inhibitors, and antioxidants.

Thus, for example, $\alpha$-olefins, such as ethylene-propylene copolymers whose viscosities have been reduced to a certain level and whose molecular weight distribution is narrow will exert excellent additive properties in lubricating oils over a wide range of temperatures.

The modified polymers of the invention are excellent blending agents. They impart unusual properties to other polymers even in small amounts, even when the other polymers have a considerably different MFR than the modified blending polymer. Generally, the polymers of the invention can be beneficially blended with other polyolefins, i.e. thermoplastics and elastomers in quantities of 0.001 to 99, preferably 0.01 to 20 and most preferably 0.01 to 10 weight percent based on the weight of the resulting blend.

In an especially preferred embodiment, the process of the present invention is directed to grafting a polymer of a $C_2$ to $C_8$ mono-α-olefin or its copolymers with acrylic acid. The polymers of $C_2$ to $C_8$ mono-α-olefins are referred to as polyolefins and for the purpose of this invention are to include copolymers of the $C_2$ to $C_8$ mono-α-olefins with each other and with other monomers as well as the homopolymers.

Polymers containing diolefins such as butadiene and isoprene are also suitable. The polyolefins are produced, utilizing in most instances a transition mtal-type catalyst, but can also be Phillips-type catalysts, cationic or anionic-type initiators and high pressure free radical technology. The processes for making the $C_2$ to $C_8$ polyolefins are well known and form no part of the present invention.

Examples of suitable polyolefins, both plastic and elastomeric, include low or high density polyethylene, polypropylene, polybutene-1, poly-3-methylbutene-1, poly-4-methylpentene-1, copolymers of monoolefins with other olefins (mono- or diolefins) or vinyl monomers such as ethylene-propylene copolymers or with one or more additional monomers, i.e. EPDM, ethylene/butylene copolymer, ethylene/vinyl acetate copolymer, ethylene/ethyl acrylate copolymer, propylene/4-methylpentene-1 copolymer and the like.

The term "copolymer" includes two or more monomer constituents and substituted derivatives thereof.

The preferred polyolefins employed in the present invention contain propylene and/or ethylene, i.e. polypropylene and polyethylene. The starting polymer used as a base material in the present invention will preferably have a melt index (MI) of 0.05 to 1000, preferably 0.05 to 50, and most preferably 0.05 to 10, or melt flow rate (MFR) between about 0.1 to 50 and preferably 0.1 to 5.0, most preferably 0.5 to 2.

In the preparation of normally solid polymers of 1-olefins, certain rheological properties are frequently utilized for control purposes. One of these rheological properties more usually employed is melt index or melt flow rate which characterizes the processability of the polymers and is also an approximate indication of polymer molecular weight.

The melt index of polyethylene is measured normally according to the ASTM text D-1238-65T. In this test the rate of extrusion in grams per 10 minutes (through an orifice 0.0825 inch in diameter and 0.315 inch in length) is determined for the polymer at 190° C. under the weight of a piston having a diameter of 0.373 inch and weighing in combination with its plunger 2160 grams.

The melt flow rate (MFR) of polypropylene is determined by the same procedure except at a temperature of 230° C. according to ASTM D-1238-65T.

The apparatus utilized for determining melt index is defined in ASTM manual as a "dead-weight piston plastometer."

Generally speaking, polypropylene from a reactor will have MFR below 1, while polyethylenes from a reactor can have a MI of about 0.05 to 50.

The preferred monomers to be grafted to the $C_2$ to $C_8$ polyolefin and other polymers according to the present invention are maleic anhydride, acrylic acid, methacrylic acid, glycidyl acrylate, acrylamide, hydroxy $C_1$ to $C_{20}$ alkyl methacrylates and their derivatives. Other that can be used are described elsewhere herein. However, other monomers may be added in admixture with these such as maleic anhydride (MA), styrene, acid esters, salts and the like to form graft copolymers. MA and styrene and MA and acrylic acid are preferred over MA alone when polymer grafts of MA are desired.

The grafting reaction is initiated by a free-radical initiator which is preferably an organic peroxygen compound. Especially preferred peroxides are t-butyl perbenzoate, dicumyl peroxide, 2,5-dimethyl-2,5-di-tert-butylperoxy-3-hexyne (Lupersol 130), $\alpha,\alpha'$-bis(tert-butylperoxy)diisopropyl benzene (VulCup R), or any free radical initiator having a 10-hour half-life temperature over 80° C. or mixtures thereof. Generally, the higher the decomposition temperature of the peroxygen compound, the better. See pp 66–67 of *Modern Plastics*, November 1971, which is incorporated hereby reference, for a more complete list of such compounds.

AN ILLUSTRATIVE EMBODIMENT

Referring to FIG. 1, an extruder 1, having a feed zone 2, a reaction zone or chamber 3, and a final metering zone 4 is utilized to carry out a preferred embodiment of the grafting process of the present invention.

In effect, polypropylene of a predominantly isotactic crystalline nature is introduced into a hopper 5 in the feed zone 2 of the extruder 1. The extruder screw 6 in feed zone 2 can be of various conventional designs such as a feed portion 7, a transition portion 8 and a first stage metering portion 9.

In feed zone 2, the polypropylene is heated by heaters 10 to a barrel temperature in the range of 400° to 650° F., preferably 400° to 550° F. It is one of the advantages of this invention that fairly low temperatures can be used to accomplish outstanding modification. In processes utilizing $O_2$ as an initiator, much higher barrel temperatures, i.e. about 600° to 800° F. are required and control is awkward. In processes utilizing heat alone, even higher temperatures and reaction times are necessary.

Extruder screw 6 has a root (sometimes called core) starting at the initial boundary of reaction zone 3 with a reduced cross-sectional area 11. This provides additional volume for reaction zone 3. When polymer under pressure reaches zone 3a, the increased available volume results in a pressure drop, i.e., decompression, so that particular mass of polymer is not subjected to the ordinarily high pressures in the extruder.

An injection line 12 connects reaction zone 3 to a source of initiator, preferably a peroxide. In some instances the peroxide will be combined with a active monomer. For the purposes of this specific embodiment, the monomer is acrylic acid and the initiator is VulCup R.

Injection of initiator or initiator and monomer at this point, where low pressures in zone 3a prevail, provides thorough dispersion of the initiator in polypropylene over an extremely short period of time and appreciable scission or degradation of the polypropylene results. Appropriate controls of the polypropylene feed rate and screw speeds are maintained.

The process of the invention can be conveniently operated to give high throughputs with good quality. In this particularly preferred embodiment, the initiator and acrylic acid are added as a liquid blend to zone 3. When only degradation is desired, initiator alone or initiator dissolved in a solvent is introduced into zone 3.

It has been found that appreciable degradation of the polypropylene occurs when the back pressure against the liquid mixture of initiator and acrylic acid in injection line 12 is less than about 100 psig, preferably about 0 psig.

The pressure in injection line 12, therefore, provides one indicia that the polypropylene feed rate and screw speed are being appropriately controlled for the particular products desired.

The resulting graft copolymers of the present invention have been appreciably degraded and changed in molecular weight distribution as compared to the base polymer. This is demonstrated by the fact that the graft copolymers of the invention have a lower die swell than the polypropylene base stock used in making the copolymer. Lower molecular weights are also indicated by changes in melt flow rates.

The portion of the extruder heated by heaters 13 will have a temperature of from about 160° to 450° F., preferably 250° to 450° F. The important thing is that the polymer be substantially in a melt phase during the reaction. The extruder screw 6 in the latter portion of reaction zone 3 can have any desired root cross-sectional area desirable to provide for pumping and ancillary mixing if desired and to allow residual reactants to complete their reaction.

It is to be noted that some homopolymerization of the acrylic acid (or any other monomer) to form polyacrylic acid also occurs. But this usually does not exceed 30% of the total acrylic polymer formed, particularly at the low monomer concentrations.

Preferably, the decompression portion 3a of the screw is immediately followed with transition zone 3b of gradually increasing screw root cross-sectional area followed by a metering zone 3c of constant cross-sectional screw root area.

Thereafter, extruder screw 6 has a melt seal (also called cap or blister) 14 which prevents the free escape of initiator and acrylic acid from reaction zone 3.

Screw 6 also has a second decompression portion 15 following blister 14.

Vent line 16 (which can be optionally provided with vacuum, if desired) is positioned above decompression portion 15 to remove gases or vapors. When operating without vent line 16, blister 14 and decompression zone 15 may be omitted.

The graft copolymer and homopolymer blend is then passed through metering zone 4 where it is extruded from a die 17 at the end of extruder 1.

The extruder barrel temperature heated by heaters 18 in metering zone 4 is in the range of 350° to 550° F., preferably 350° to 450° F.

Referring now to FIG. 2, extruder 20, having a feed zone 21, a reaction zone 22 and a final metering zone 23, is also utilized to carry out the grafting process of the present invention. The process is generally similar to that described above for FIG. 1, except as follows. In one preferred embodiment, the initiator and acrylic acid are injected through injection port 24 at a point where the extruder screw 25 has a root 26 of very large cross-sectional diameter. The clearance between this portion of the root and the interior of extruder 20 is very small and will vary with extruder size. For example, in a 2-inch extruder apparatus this clearance is from 5 to 50, preferably 10 to 25, and most preferably 10 to 20 mils.

In another preferred embodiment shown in FIG. 3, the root of increased cross section or mixing device 26 is shown with a series of channels cut in the perimeter of the device. This results in a series of dead end channels. Under pressure, this forces the polymer out of the inlet channels and across the outer surface to the outlet channel. Other suitable devices could be used.

The novelty and unobviousness of the invention reside in the combination of such a mixing device with means to introduce reactants at a relatively early stage in the extrusion process.

In any event, whether the embodiment of FIG. 2 or FIG. 3 is used, the polymer forms a thin fluid film under relatively high shear as compared to the other portions of the extruder.

The initiator and/or acrylic acid are injected at pressures which range between 200 and 5,000 psi or more specifically, between 500 and 3,500 psi. At these high pressures and because only a thin film of polypropylene is present at the high shear-thin film zone 27 of reaction zone 22, intensive, instantaneous mixing followed by appreciable degradation of the polymer, e.g. polypropylene, occurs.

Extruder 20 is also provided with a blister 29 and a vent 30. As in the case of the FIG. 1 extruder, the vent, decompression zone, and blister may be eliminated if desired.

As illustrated by the two embodiments of FIG. 1 and FIG. 2, various extruder designs may be employed to carry out the graft copolymerization process of the present invention. However, the common characteristic of each extruder design is that thorough, instantaneous mixing of the initiator and acrylic acid with the polymer, i.e. polypropylene, occurs. The extremely high degree of mixing which characterizes the process of the present invention is evidenced by appreciable degradation of the polymer. Evidence for the appreciable degradation of the polyolefin is shown by the substantial increase in the melt flow rate or melt index of the copolymer over the base resin. Evidence for a narrowing of the molecular weight distribution is seen from the fact that the die swell of the graft copolymer is lower than the die swell of the polyolefin base stock used in making the copolymer. It is to be emphasized that a change in molecular weight distribution leads to many useful and novel properties of the resulting polymers.

DIE SWELL

Some high molecular weight polymers such as polyolefins when forced through a capillary die of a relatively short length produce an extrudate of a larger diameter than the diameter of the capillary.

This property of polymers has been characterized as die swell which is expressed numerically as the ratio of the diameter of the extrudate to the diameter of the capillary (by some the ratio to the first power and by others to the second power). The term "die swell" as used herein is defined as follows:

$$\text{die swell} = \left(\frac{D_e}{D_o}\right)^2$$

where:

$D_e$ is the extrudate diameter
$D_o$ is the capillary diameter.

The numerical value of die swell is also dependent on the geometry of the rheometer used to force the polymer through the capillary. In obtaining the numerical values set forth herein, and in the tables which follow, a rheometer having a rheometer barrel of ⅜ inch I.D. (inside diameter) was used wherein the barrel was heated to a temperature controlled to ±2° F. of the recorded temperature and the polymer was forced through a capillary having a 0.03018 inch I.D. and which was 1.006 inches long. The capillary had a 90° entry angle.

The measurements were made by forcing the polymer through the capillary by a plunger operating at a constant speed or a constant shear rate ($\gamma°$) ranging from 13.5 reciprocal seconds to 338.3 reciprocal seconds ($sec^{-1}$). The polymer was forced through the capillary into ambient air at room temperature (70° – 80° F.).

The measurement of die swell is frequently used as a gross measure of molecular weight distribution in polyolefins; high die swell resins possess broader molecular weight distribution than polymers having lower die swells.

Thus, the polymers of the invention have die swells lower than the base stock from which they were prepared, are the product of a random chain scission process, which results in molecular weight degradation and hence possess narrower molecular weight distribution than the base polymers.

It should be noted that the exceptionally high MFR grafted polymers (i.e. those having a MFR of about 20 to 1,000) can also be made by utilizing a starting polymer having a MFR in that range and conventionally grafting and/or additively degrading.

Films and coatings made from the grafted polymers or laminated or coated on other films or structures made from polar monomers, show outstanding properties. Nylon and other polar materials can be used as a base structure.

To summarize, the graft copolymers of the present invention have outstanding utility due to their unique chemical and physical properties as bonding agents, adhesives and coatings. The graft copolymers are especially good as adhesives for metals and can be used in forms such as adhesive sheets, powders, tapes, or laminated products. They can be added to conventional adhesive compositions.

Still further, the mechanical properties of the grafted polymer, preferably polypropylene, may be enhanced by incorporating with the copolymer certain fillers to dramatically increase the bonding ability of the conventional adhesive.

For example, a polypropylene grafted with 6% acrylic acid was found to have aluminum to aluminum shear adhesion of about 1,200 psi at 72° F. and in excess of 250 psi at 250° F. These fillers are preferably asbestos talc and fiber glass, and of the types of asbestos, chrysotile asbestos is preferred. The filled acrylic acid grafted polyolefin may be injection molded into objects such as kick-panels for automobiles, washing machine tubs or other uses where enhanced mechanical properties are required.

The polymers of the invention are also very useful in powdered form, i.e. from 20 to 325 mesh or smaller.

The graft copolymers of this invention also have outstanding utility as coupling agents. Thus they can be coated in thin films on various fillers such as glass fibers which are subsequently dispersed in a polymer matrix, which polymer can be selected from a wide available variety.

An especially useful post-modification or simultaneous reaction with an acid grafted polymer is to improve the UV stability in either of two ways or a combination of the two. There are:
 a. Nickel-containing basic salts, e.g. nickel oxide, nickel hydroxide, etc., are reacted with the acid groups in the polymer; and
 b. The hydroxy functionality of a hydroxy benzophenone is reacted with the acid groups of the polymer.

In addition, conventional stabilizers are much more compatible with acid modified polyolefins, and the product of the invention can be used to masterbatch stabilizer or other additives which are not normally compatible with polyolefins.

For instance, typical masterbatch will have from 10 to 70, preferably 10 to 50 and most preferably 10 to 30, weight percent additive and the balance is acid-modified polymer.

It will be understood that while the modified polymers of the invention are especially suitable for many of the end use applications discussed herein, grafted polymers prepared by processes known to the art will also be useful in many of these end uses.

The acid grafts of the invention can be used as polymerization initiators for ethers, esters, polyethers, polyamides, etc. They can also serve as initiators and growth sites for ring opening reactions such as those utilizing caprolactam.

Thus many end uses, post-modifications, etc., disclosed herein have never been previously described or available to the art. Thus, these processes for modifying and using graft polymers are novel and unobvious in their own right.

GENERAL REACTION CONDITIONS

The free radical initiator is used in amounts corresponding to 0.005 to 5, preferably 0.02 to 2, most preferably 0.02 to 1.0 weight percent based on polymer.

The monomer to be graft polymerized is used in amounts of 0.01 to 100, preferably 0.05 to 50, and most preferably 0.1 to 25 weight percent of the base polymer. An especially preferred range is from 0.1 to 1.5. High graft conversions are obtained at these levels. Furthermore, adhesion properties are also greatly enhanced over the base polymer, even with such low quantities of graft.

Generally, the monomer and initiator are blended together and added simultaneously, except in the situation of a polyethylene or ethylene predominant copolymer.

CHARACTERISTICS OF INVENTIVE POLYMER

The novel graft polymers of the invention are characterized by several important properties. These are:
 1. A MFR of from 3 to 1,000, preferably 11 to 250, most preferably 21 to 100 and at least 50% or more, preferably 100% or more, and most preferably at least 150% or more higher than the MFR of a starting polymer having a MFR of from no-flow to 150 as measured under conditions of ASTM test No. D-1238-65T.
 2. A polymerized graft comonomer content of from 0.02 to 20, preferably 0.1 to 10, and most preferably 0.2 to 8, based on the total weight of the graft copolymer. (In this connection, it has been noted that the beneficial effects of the graft are noted at relatively low grafted comonomer contents, i.e. 1% and less.)

3. A die swell at least 0.05, preferably at least 0.1 and most preferably 0.15 of a unit less than that of the base polymer.

The present invention will be further illustrated by the following specific examples.

EXAMPLE 1

A series of compositions were prepared by introducing polypropylene having a MFR of 0.4 into the extruder of FIG. 1 through hopper 5. Into injection line 12, connected to a side port was introduced a mixture of acrylic acid and a peroxide (VulCup R) in the ratios as set forth in Table I which follows. For compositions A-G, inclusive, the acrylic acid and peroxide were added with essentially no back pressure on the injection line 12, which was located over the decompression portion of the screw.

For compositions H-K, in contrast, the acrylic acid and peroxide were added to a standard extruder under conditions where the reaction zone was filled with polymer and considerable melt pressure was evident against the injection line. The conditions under which the graft copolymerizations were carried out as fully set forth in Tables I and II as follows:

TABLE I

| Composition Barrel Temperatures | (No Pressure Condition) | | | | | | |
|---|---|---|---|---|---|---|---|
| | A | B | C | D | E | F | G |
| Feed Zone, ° F. | 520–490 | 520–490 | 520–490 | 520–490 | 520–490 | 520–490 | 520–490 |
| Reactor Zone, ° F. | 305–400 | 320–400 | 305–400 | 305–400 | 295–400 | 305–400 | 305–400 |
| Metering Zone, ° F. | 450–400 | 450–400 | 450–400 | 450–400 | 450–400 | 450–400 | 450–400 |
| Output, lb/hr | 92 | 90 | 95 | 99 | 95 | ~90 | 90 |
| Screw Speed, RPM | 160 | 160 | 160 | 160 | 160 | 160 | 160 |
| gr Peroxide/1000 gr Acrylic Acid | 15 | 15 | 15 | 15 | 30–35 | 15 | 15 |
| Acrylic Acid Injection Rate, wt. % | 3.26 | 6.22 | 6.46 | 6.30 | 6.35 | ~8.9 | 9.92 |
| Total Acrylic Acid in Product, wt. % | 2.66 | 5.85 | 5.58 | 5.29 | 6.03 | ~7.5 | 8.60 |
| % Conversion of Acrylic Acid | 81 | 94 | 86 | 84 | 95 | ~85 | 87 |
| Melt Pressure Against Injection Line, psi | 0 | 0 | 0 | 0 | 0 | 0 | 0 |

TABLE II

| Composition Barrel Temperatures | (Full Pressure Condition) | | | |
|---|---|---|---|---|
| | H | I | J | K |
| Feed Zone, ° F. | 520–490 | 520–490 | 520–490 | 520–490 |
| Reactor Zone, ° F. | 300–400 | 300–400 | 300–400 | 300–410 |
| Metering Zone, ° F. | 450–400 | 450–400 | 450–400 | 450–400 |
| Output, lb/hr | 80 | 92 | 80 | 91 |
| Screw Speed, RPM | 160 | 160 | 160 | 160 |
| gr Peroxide/1000 gr Acrylic Acid | 15 | 15 | 15 | 15 |
| Acrylic Acid Injection Rate, wt. % | 3.84 | 6.70 | 7.83 | 9.96 |
| Total Acrylic Acid in Product, wt. % | 3.18 | 5.82 | 6.96 | 8.96 |
| % Conversion of Acrylic Acid | 83 | 87 | 89 | 90 |
| Melt Pressure Against Injection Line, psi | 150 | ~400 | 150–300 | 300–500 |

It has been observed that when the graft monomer is incorporated to be about 5 wt. % or less of the total graft polymer, graft conversions are relatively high. At about 15 to 20 wt. % of the total graft, conversions are lower, i.e. 50 to 80%.

As can be seen from the above tables, the acrylic acid percentage of the copolymer is related to the injection rate. Total conversion of acrylic acid to polymer is relatively high under both sets of conditions.

EXAMPLE 3

The compositions of Example 1 were evaluated.

The thorough dispersion and mixing of the initiator with the resulting appreciable degradation of the polypropylene for compositions A–G is clearly apparent in the lower die swell and higher melt flow rate data obtained for these to the base polymer.

In contrast, the polypropylene acrylic acid graft copolymers of compositions H–K have die swells either the same or higher than the polypropylene base stock and suffered very little molecular weight loss. This clearly indicates no appreciable degradation of the compositions H–K during the grafting of the acrylic acid.

Furthermore, the increase in MFR of the graft copolymers in compositions A–G over the MFR of the base resin shows that appreciable degradation occurred in contrast to the slight increase in MFR of the graft copolymers of compositions H–K over the MFR of the base resin.

The die swell data and melt flow rate data are summarized as follows in Tables III and IV. (Acrylic acid graft contents have been rounded off to the closest whole number.)

TABLE III

| Composition | Base Stock | A | B | C | D | E | F | G |
|---|---|---|---|---|---|---|---|---|
| MFR | 0.4 | 6.5 | 11.2 | 10.6 | 10.2 | 49.7 | 11.4 | 13.3 |
| Wt. % Acrylic Acid | 0 | 3 | 6 | 6 | 6 | 6 | 9 | 9 |

TABLE III-continued

| Composition | Base Stock | A | B | C | D | E | F | G |
|---|---|---|---|---|---|---|---|---|
| (Approximate) | | | | | | | | |
| Die Swell at 400° F. | | | | | | | | |
| $\dot{\gamma} = 13.5$ sec$^{-1}$ | 1.67 | 1.35 | 1.35 | 1.35 | 1.42 | 1.50 | 1.35 | 1.20 |
| $\dot{\gamma} = 33.8$ sec$^{-1}$ | 1.76 | 1.35 | 1.35 | 1.35 | 1.42 | 1.50 | 1.35 | 1.27 |
| $\dot{\gamma} = 67.7$ sec$^{-1}$ | 1.85 | 1.42 | 1.35 | 1.35 | 1.42 | 1.50 | 1.35 | 1.42 |
| $\dot{\gamma} = 135.3$ sec$^{-1}$ | 1.94 | 1.50 | 1.42 | 1.35 | 1.42 | 1.50 | 1.50 | 1.42 |
| 10 $\dot{\gamma} = 338.3$ sec$^{-1}$ | 2.53 | 1.67 | 1.76 | 1.59 | 1.59 | — | 1.85 | — |

TABLE IV

| Composition | H | I | J | K |
|---|---|---|---|---|
| MFR | 1.5 | 0.9 | 0.8 | 1.7 |
| Wt. % Acrylic Acid (Approximate) | 3 | 6 | 6 | 9 |
| Die Swell at 400° F. | | | | |
| $\dot{\gamma} = 13.5$ sec$^{-1}$ | 1.67 | 1.67 | 1.67 | 1.76 |
| $\dot{\gamma} = 33.8$ sec$^{-1}$ | 1.76 | 1.85 | 1.85 | 1.94 |
| $\dot{\gamma} = 67.7$ sec$^{-1}$ | 1.94 | 1.94 | 1.94 | 2.22 |
| $\dot{\gamma} = 135.3$ sec$^{-1}$ | 2.22 | 2.32 | 2.32 | 2.75 |
| $\dot{\gamma} = 338.3$ sec$^{-1}$ | 2.53 | 2.64 | 2.75 | 3.32 |

EXAMPLE 4

To illustrate the incorporation of fillers, particularly Chrysotile asbestos and fibrous glass, and the enhanced mechanical properties obtained, the polypropylene acrylic acid graft copolymer of composition E was compared with unmodified polypropylene homopolymer used as a base which had a MFR of about five. The mechanical properties of the polypropylene acrylic acid graft copolymers of the present invention are greatly improved as compared to the properties of a filled unmodified polypropylene homopolymer. The results are summarized below in Tables V and VI.

TABLE V

| Sample | Izod Impact ft lb/in | | | | Secant Flexural Modulus Mpsi | Tensile Strength psi | Heat Deflection Temperature at 264 psi ° C |
|---|---|---|---|---|---|---|---|
| | Notch 72° F | Unnotch 72° F | Unnotch 0° F | Unnotch −20° F | | | |
| Polypropylene + 25% Chrysotile Asbestos | 0.60 | 9.2 | 4.7 | 4.5 | 342 | 5,911 | 78.4 |
| Polypropylene Grafted with 6% Acrylic Acid + 25% Chrysotile Asbestos | 0.51 | 10.3 | 5.9 | 5.7 | 409 | 6,994 | 88.0 |
| Polypropylene + 35% Chrysotile Asbestos | 0.71 | 7.2 | 4.4 | 4.3 | 422 | 6,007 | 96.0 |
| Polypropylene Grafted with 6% Acrylic Acid + 35% Chrysotile Asbestos | 0.75 | 12.1 | 6.9 | 6.8 | 500 | 8,256 | 101.0 |

TABLE VI

| Sample | Izod Impact ft lb/in | | | | Secant Flexural Modulus Mpsi | Tensile Strength psi | Heat Deflection Temperature at 264 psi ° C |
|---|---|---|---|---|---|---|---|
| | Notch 72° F | Unnotch 72° F | Unnotch 0° F | Unnotch −20° F | | | |
| Polypropylene + 50% Chrysotile Asbestos | 0.54 | 4.5 | 3.4 | 3.4 | 557 | 6,364 | 101.8 |
| Polypropylene Grafted with 6% Acrylic Acid + 50% Chrysotile Asbestos | 0.78 | 8.9 | 6.6 | 6.2 | 631 | 8,825 | 114.0 |
| Polypropylene + 20% Fiberglass (⅛″) | 1.7 | 8.5 | 7.2 | 6.9 | 513 | 9,941 | 102.4 |
| Polypropylene** Grafted with 9% Acrylic Acid + 20% Fiberglass (⅛″) | 2.3H* | 10.5 | 8.4 | 6.9 | 592 | 11,659 | 148.0 |

*Hinged
**Composition G

EXAMPLE 5

The procedure for composition A of Example 1 was essentially duplicated except that glycidyl acrylate was substituted for acrylic acid. The resultant modified graft copolymer exhibited unusually high adhesion to aluminum foil, polyester (Mylar) and nylon film when compression molded at 450° F. The results are summarized below in Table VII.

TABLE VII

| Sample | Peel Strength lb/in | |
|---|---|---|
|  | Al foil | Mylar |
| Polypropylene | 0 | 0 |
| Polypropylene-g-glycidyl acrylate | 12.0 | Too strong to test |

EXAMPLE 6

The general procedure of Example 1 was repeated except that maleic anhydride was substituted for acrylic acid and that the maleic anhydride was added with the polypropylene and the initiator (dicumyl peroxide, shown as DCP, or LUPERSOL 130, shown as L) was added in benzene or xylene solvent directly to the polymer melt.

The starting polypropylene had a MFR of about 0.5.

A series of runs were carried out. The conditions and data on the resulting compositions are summarized below in Table VIII.

TABLE VIII

Maleic Anhydride Grafts

| Composition | Peroxide Solvent | Atm. | % DCP | % Maleic Anhydride Added | Product % Maleic Anhydride Total | Product % Maleic Anhydride Graft | MFR (230° C.) |
|---|---|---|---|---|---|---|---|
| L | Xylene | Air | 0.16 | 1.0 | 0.33 | 0.27 | 69 |
| M | Xylene | $N_2$ | 0.14 | 1.0 | 0.43 | 0.28 | 71 |
| N | Benzene | Air | 0.13 | 1.0 | 0.27 | 0.23 | 51 |
| O | Benzene | Air | 0.14 | 0 | 0 | 0 | 11.5 |
| P | Benzene | $N_2$ | 0.14 | 1.0 | 0.28 | 0.23 | 46 |
| Q | Benzene | Air | 0 | 1.0 | 0.23 | 0 | 1.2 |
| R | Benzene | $N_2$ | 0 | 1.0 | 0.31 | 0 | 1.1 |
| S | Benzene | $N_2$ | 0.085L | 1.0 | 0.38 | 0.24 | 60 |
| T | Benzene | Air | 0.085L | 1.0 | 0.33 | 0.21 | 56 |
| U | Benzene | Air | 0.23 | 3.0 | 0.58 | 0.42 | 56.9 |
| V | Benzene | Air | 0.29 | 3.0 | 0.90 | 0.53 | — |
| W | Benzene | Air | 0.085L | 3.0 | — | — | — |
| X | Benzene | Air | 0.044L | 1.0 | 0.25 | 0.17 | 39.0 |
| Y | Benzene | Air | 0.084L | 1.0 | 0.28 | 0.20 | 57.4 |
| Z | Benzene | Air | 0.089L | 1.0 | 0.29 | 0.22 | 54.8 |
| AA | Benzene | Air | 0.052L | 1.0 | 0.33 | 0.17 | 24.3 |
| BB | Benzene | Air | 0.047L | 3.0 | 0.33 | 0.20 | 26.2 |
| CC | Benzene | Air | 0.094L | 3.0 | 0.41 | 0.29 | 64.2 |
| DD | Benzene | Air | 0.088L | 3.0 | 0.40 | 0.26 | 69.8 |
| EE | Benzene | Air | 0.044L | 3.0 | 0.35 | 0.20 | 35.9 |
| FF | Benzene | Air | 0.10L | 0 | — | — | 37.9 |
| GG | Benzene | Air | 0.050L | 0 | — | — | 13.5 |
| HH | Benzene | Air | 0.045L | 0 | — | — | 17.6 |
| II | Benzene | Air | 0.087L | 0 | — | — | 35.2 |
| JJ | Benzene | Air | 0.049L | 1.0 | 0.26 | 0.15 | 33.0 |

As can be seen from the above table, grafts with good maleic anhydride conversions as well as high melt flow rates can be conveniently prepared by the method of the invention.

EXAMPLE 7

Composition V was reinforced with an asbestos filler and compared in several important properties with the base polypropylene similarly reinforced. The results are summarized below in Table IX.

TABLE IX

| Sample | Izod Impact ft lb/in Notch 72° F | Izod Impact ft lb/in Unnotch 72° F | Izod Impact ft lb/in Unnotch 0° F | Izod Impact ft lb/in Unnotch −20° F | Secant Flexural Modulus Mpsi | Tensile Strength psi | Heat Deflection Temperature at 264 psi ° C |
|---|---|---|---|---|---|---|---|
| Polypropylene + 35% Chrysotile Asbestos | 0.63 | 7.5 | 4.8 | 4.3 | 342 | 6,165 | 82.0 |
| Maleic Anhydride Grafted Polypropylene + 35% Chrysotile Asbestos | 0.73 | 11.1 | 7.6 | 6.6 | 372 | 7,480 | 83.0 |

As can be seen from the above table, improved stiffness, impact and tensile strength result, while heat deflections are comparable to the base polypropylene.

When talc or fibrous glass is substituted for the above filler, similar results are observed.

It is also to be noted that in this connection generally from 100 to 5 weight percent of grafted polymer will impart improved results. Thus considerable savings can often be effected by using less than 100% of the grafted resin batch.

It is further to be noted that higher MFR grafted polymers, i.e. 50 MFR, give directionally better composite properties than lower MFR resins, i.e. 11 MFR. This is caused by:

1. improved wetting of the fibers, resulting in greater adhesive strength of the polymer/fiber bond, and
2. less fiber attrition during compounding and molding of the composite due to the lower viscosity of the higher MFR material, resulting in longer length fibers.

The modified materials of the invention also display low shrinkage and warping characteristics upon injection molding.

For the purposes of this application, the polymers included in the scope thereof include polystyrene and polymers containing styrene as a substituent.

Included in the fiber materials are Saran filaments and microspheres. Saran is defined as a polymer consisting wholly or substantially or vinylidene chloride monomer. Where comonomers are present, acrylonitrile is particularly preferred.

The temperature at which the polymers are processed can be lowered considerably by incorporating a plasticizer for the base polymer. If grafting is to be carried out, the plasticizer is preferably inert to the grafting reaction and can be separated later.

Himic anhydride or acid is 3,6-endomethylene-$\Delta^4$-tetrahydro-Phthalic or acid.

The grafted polymers of the invention, particularly polyolefins and most particularly elastomer and plastic blends, are especially suitable for hot-melt adhesive constituents. Blends of acrylic acid grafted polypropylene and EPR are particularly preferred.

The grafted polymers, especially acrylic acid grafted polypropylene, are excellent additives to polyvinyl materials such as PVC as processing aids, i.e., lubricants and heat stabilizers. About 1 to 20 weight percent of a 6% acrylic acid graft makes an outstanding novel PVC blend composition.

The grafted polymers of the invention are also very compatible with dyes and carbon black. Therefore they are especially suitable as carrying materials for master batches for dyes, carbon black, other fillers, additives and the like.

The process of the invention is particularly suitable for preparing blends of ordinarily hard to mix or incompatible components. For instance, blends of saran and polypropylene with good flame retardancy are made in the extruder process.

Another technique which can be used in an extruder process is to use polypropylene and the like as a carrier for materials which are sometimes too slippery in fluid form for the extruder to handle, i.e. low density polyethylene, EPR, etc.

Although the above examples were carried out with the apparatus of FIG. 1, it is to be noted that the apparatus of FIGS. 2 and 3 has also been used. In many instances, the results are even better than the outstanding results obtained from the FIG. 1 apparatus.

In the above examples and specification, all weights are weight percents unless otherwise indicated.

Another especially preferred composition to be grafted comprises 20 to 60 weight percent polypropylene, 20 to 40 weight percent polyethylene or ethylene-propylene block polymer and 20 to 40 weight percent of EPR or EPDM. From 0.5 to 15 weight percent of acrylic acid grafted to this blend is especially preferred.

Although unsaturated monomers are preferred, saturated carboxylic acids can be used to incorporate carboxyl functionality to the backbone of a degraded polymer.

A very important aspect of the invention which must be emphasized is that in its preferred version simultaneous polymer degradation and grafting are accomplished. This is an accomplishment unrealized by the art.

The especially preferred grafted polymer compositions of the invention are characterized by the characteristics in the following Tables A and B:

TABLE A

| Predominantly Ethylene-Containing Polymers | | | |
|---|---|---|---|
| Melt Index | | Die Swell Reduction | |
| Starting | Final | at least: | % MI Increase |
| 0.05 to 1000 | 0.05 to 1000 | 0 to .05, pref. 0 to 0.1, most pref. 0 to 0.15 | 0 to 20,000, pref. 0 to 1,000, most pref. 0 to 500 |
| 0.05 to 50 | 0.05 to 250 | 0 to .05, pref. 0 to 0.1, most pref. 0 to 0.15 | 0 to 20,000, pref. 0 to 1,000, most pref. 0 to 500 |
| 1 to 10 | 1 to 10 | 0 to .05, pref. 0 to 0.1, most pref. 0 to 0.15 | 0 to 20,000, pref. 0 to 1,000, most pref. 0 to 500 |

TABLE B

| Predominantly $C_3$ to $C_8$ Containing Polymers | | | |
|---|---|---|---|
| MFR | | Die Swell Reduction | % MFR Increase |
| Starting | Final | at least: | at least: |
| 0.3 to 0.9 | 3 to 1,000, pref. 3 to 300, most preferably 3 to 200 | 0.05, preferably 0.10, most preferably 0.15 | 1,000, preferably 1500, most preferably 2,000 |
| 0.91 to 5.0 | 5 to 1,000, pref. 5 to 300, most preferably 5 to 200 | .05, preferably 0.10, most preferably 0.15 | 500, preferably 700, most preferably 900 |
| 5.01 to 10 | 15.5 to 1,000, pref. 20 to 300, most preferably 25 to 250 | .05, preferably 0.10, most preferably 0.15 | 300, preferably 400, most preferably 750 |
| 10.1 to 150 | 15 to 1,000, pref. 20 to 300, most preferably 25 to 250 | .05, preferably 0.10, most preferably .15 | 50, preferably 100, most preferably 150 |

What is claimed is:

1. A masterbatch comprising 50 to 90 wt. percent of a grafted polymeric composition, prepared from a base polyolefin polymer, comprising from 0.02 to 20 weight percent of grafted compound and having a melt flow rate of from 3 to 1000 and at least 50% higher than said base polymer and a die swell of at least 0.05 unit less than that of said base polymer and 10 to 70 weight percent of conventional additive for polyolefins selected from the group consisting of heat stabilizers, slips agents, antioxidants, anti-static agents, colorants, flame retardants, plasticizers, preservatives, processing aids, and fillers.

2. A composition according to claim 1 wherein said proportions are 10 to 50 of said additive and 50 to 90 of said grafted composition.

3. A masterbatch composition according to claim 1 wherein said additive is a colorant.

4. A masterbatch composition according to claim 3 wherein said colorant is carbon black.

5. A grafted polymeric composition, prepared from a base polymer, comprising from 0.02 to 20 weight percent of grafted compound and having a melt flow rate of from 3 to 1000 and at least 50% higher than said base polymer and a die swell of at least 0.05 unit less than that of said base polymer which also contains a colorant additive.

6. The composition of claim 5 in which said colorant is carbon black.

7. A grafted polymeric composition, prepared from a base polymer, comprising from 0.02 to 20 weight percent of grafted compound and having a melt flow rate of from 3 to 1000 and at least 50% higher than said base polymer and a die swell of at least 0.05 unit less than that of said base polymer which also contains fibrous reinforcement materials.

8. A masterbatch composition comprising from 10 to 70 weight percent of a conventional additive for polyolefins selected from the group consisting of heat stabilizers, slip agents, antioxidants anti-static agents, colorants, flame retardants, plasticizers, preservatives, processing aids, and fillers and 30 to 90 weight percent of a grafted polymeric composition, prepared from a base polymer, comprising from 0.02 to 20 weight percent of grafted compound and having a melt flow rate of from 3 to 1000 and at least 50% higher than said base polymer and a die swell of at least 0.05 unit less than that of said base polymer, wherein said grafted composition has been prepared by:
   a. introducing said base polymer into an extruder with a moving positive displacement screw of varying root cross-sectional area to define a reaction zone;
   b. generating an above-atmospheric pressure within said extruder as said polymer is conveyed therethrough;
   c. applying sufficient heat in addition to working said polymer, to convert it into its fluid form;
   d. conveying said fluid polymer through the initial portion of said reaction zone whereby said fluid polymer is forced into a relatively thin, fluid film under high shear;
   e. introducing into said initial portion of said reaction zone while said polymer is in a thin-film, high-shear state sufficient of a material selected from the group consisting of:
      i. a monomer or monomers;
      ii. a free-radical initiator;
      iii. a combination of the foregoing; to measurably change either the rheological or chemical properties or both of said properties and
   f. conveying the resultant modified polymer through the remainder of the extrusion process.

9. A masterbatch composition according to claim 8 comprising 10 to 50 weight percent of said additive and 50 to 90 weight percent of said grafted composition.

10. A composition according to claim 8 wherein said base polymer is polypropylene and said grafted compound is acrylic acid polymer.

11. A composition according to claim 8 wherein said additive is a colorant.

12. A composition according to claim 11 wherein said colorant is carbon black.

13. A reinforced composition comprising
   A. a blend of from 0.01 to 10 weight percent of a grafted polymeric composition, prepared from a base polymer, comprising from 0.02 to 20 weight percent of grafted compound and having a melt flow rate of from 3 to 1000 and at least 50% higher than said base polymer and a die swell of at least 0.05 unit less than that of said base polymer, wherein said grafted composition has been prepared by:
      a. introducing said base polymer into an extruder with a moving positive displacement screw of varying root cross-sectional area to define a reaction zone;
      b. generating an above-atmospheric pressure within said extruder as said polymer is conveyed therethrough;
      c. applying sufficient heat in addition to working said polymer, to convert it into its fluid form;
      d. conveying said fluid polymer through the initial portion of said reaction zone whereby said fluid polymer is forced into a relatively thin, fluid film under high shear;
      e. introducing into said initial portion of said reaction zone while said polymer is in a thin-film, high-shear state sufficient of a material selected from the group consisting of:
         i. a monomer or monomers;
         ii. a free-radical initiator;
         iii. a combination of the foregoing; to measurably change either the rheological or chemical properties or both of said properties; and
      f. conveying the resultant modified polymer through the remainder of the extrusion process and from 90 to 99.99 weight percent of a non-grafted polyolefin and
   B. a reinforcing amount of a fibrous reinforcement.

14. A composition according to claim 13 wherein said fibrous reinforcement is fibrous glass.

15. A composition according to claim 14 wherein said non-grafted polyolefin is polypropylene.

16. A composition according to claim 14 wherein said base polymer is polypropylene and said grafted compound is acrylic acid or glycidyl acrylate.

17. A grafted polymeric composition, prepared from a base polymer, comprising from 0.02 to 20 weight percent of grafted compound and having a melt flow rate of from 3 to 1000 and at least 50% higher than said base polymer and a die swell of at least 0.05 unit less than that of said base polymer, wherein said grafted composition has been prepared by:
   a. introducing said base polymer into an extruder with a moving positive displacement screw of varying root cross-sectional area to define a reaction zone;
b. generating an above-atmospheric pressure within said extruder as said polymer is conveyed therethrough;
c. applying sufficient heat in addition to working said polymer, to convert it into its fluid form;
d. conveying said fluid polymer through the initial portion of said reaction zone whereby said fluid polymer is forced into a relatively thin, fluid film under high shear;
e. introducing into said initial portion of said reaction zone while said polymer is in a thin-film, high-shear state sufficient of a material selected from the group consisting of:
  i. a monomer or monomers;
  ii. a free-radical initiator;
  iii. a combination of the foregoing; to measurably change either the rheological or chemical properties or both of said properties; and
f. conveying the resultant modified polymer through the remainder of the extrusion process which also contains a colorant additive.

18. A composition according to claim 17 in which said base polymer is polypropylene and said grafted compound is acrylic acid or glycidyl acrylate.

19. A grafted polymeric composition, prepared from a base polymer, comprising from 0.02 to 20 weight percent of grafted compound and having a melt flow rate of from 3 to 1000 and at least 50% higher than said base polymer and a die swell of at least 0.05 unit less than that of said base polymer, wherein said grafted composition has been prepared by:
a. introducing said base polymer into an extruder with a moving positive displacement screw of varying root cross-sectional area to define a reaction zone;
b. generating an above-atmospheric pressure within said extruder as said polymer is conveyed therethrough;
c. applying sufficient heat in addition to working said polymer, to convert it into its fluid form;
d. conveying said fluid polymer through the initial portion of said reaction zone whereby said fluid polymer is forced into a relatively thin, fluid film under high shear;
e. introducing into said initial portion of said reaction zone while said polymer is in a thin-film, high-shear state sufficient of a material selected from the group consisting of:
  i. a monomer or monomers;
  ii. a free-radical initiator;
  iii. a combination of the foregoing; to measurably change either the rheological or chemical properties or both of said properties; and
f. conveying the resultant modified polymer through the remainder of the extrusion process which also contains a fibrous reinforcement.

20. The composition of claim 19 wherein said fibrous reinforcement is glass.

* * * * *